(12) United States Patent
Liu

(10) Patent No.: US 7,569,006 B1
(45) Date of Patent: Aug. 4, 2009

(54) TOOL POTS MOUNTING STRUCTURE FOR A TOOL MAGAZINE

(75) Inventor: Tony Liu, Tanzih Township, Taichung County (TW)

(73) Assignee: Gifu Enterprise Co., Ltd., Taichung County (TW)

( * ) Notice: Subject to any disclaimer, the term of this patent is extended or adjusted under 35 U.S.C. 154(b) by 0 days.

(21) Appl. No.: 12/049,365

(22) Filed: Mar. 16, 2008

(51) Int. Cl.
*B23Q 3/157* (2006.01)

(52) U.S. Cl. .............................. 483/58; 483/3; 483/62; 483/65; 483/67

(58) Field of Classification Search .............. 483/58, 483/59, 60, 62, 65, 66, 67, 3
See application file for complete search history.

(56) References Cited

U.S. PATENT DOCUMENTS

| 3,185,494 A | * | 5/1965 | Dziedzic et al. | 483/59 |
| 3,412,459 A | * | 11/1968 | Hollis | 483/9 |
| 5,704,885 A | * | 1/1998 | Lee | 483/62 |
| 6,077,206 A | * | 6/2000 | Azema | 483/3 |
| 2004/0242391 A1 | * | 12/2004 | Araki et al. | 483/65 |
| 2005/0181919 A1 | * | 8/2005 | Sakuragi et al. | 483/65 |
| 2006/0211554 A1 | * | 9/2006 | Liu | 483/67 |

FOREIGN PATENT DOCUMENTS

| JP | 60-123241 A | * | 7/1985 |
| JP | 62-044334 A | * | 2/1987 |

* cited by examiner

*Primary Examiner*—Erica E Cadugan
(74) *Attorney, Agent, or Firm*—Banger Shia

(57) ABSTRACT

A tool pots mounting structure for a tool magazine, wherein the tool pots inside can be engaged into the engaging notches of the first and second mounting discs directly without using without any bolts, pivots or pivotal structures, and without using tools, such as power screwdriver, to assemble the tool pots. Hence, not only is the assembly process simplified, the assembly cost is reduced, but also the follow-up maintenance work is also reduced. A tool change device is disposed at one side of a tool change port of the tool magazine, by using a pressure cylinder to drive a drive member to move, and further driving a pivotal member to clamp the desired tool pot, the tool pot can be pivoted to disengage from the first and second mounting discs. By such arrangements, the tool change operation can be carried out by only a single tool change device. Hence, not only is the cost considerably reduced, but also the assembly process is also much simplified.

4 Claims, 11 Drawing Sheets

TOOL POTS MOUNTING STRUCTURE FOR A TOOL MAGAZINE

BACKGROUND OF THE INVENTION

1. Field of the Invention

The present invention relates to a tool pots mounting structure for a tool magazine, and more particularly to a tool pots mounting structure which uses two mounting discs to flexibly positioning the tool pots, and a single tool change device serves to perform tool change operation.

2. Description of the Prior Art

Machining center is capable of performing various machining operations by timely and selectively using different cutting tools, and the tools storing and changing operation of such a machining center is achieved by a tool magazine.

The present invention is going to discuss the tool magazine which is used for mounting various kinds of tool pots and mounting disc. With reference to FIGS. 1 and 2, which show the tool pots 10, the mounting disc 11 and the tools 12 of a conventional tool magazine. The tool pots 10 are used to receive the tools 12, and the respective pots 10 and the mounting disc 11 are connected in such a manner that each tool pot 10 is formed on its outer surface with a pivot portion 101, then the pivot portion 101 is pivotally connected to a pivot structure 15 via a pivot 13 and a pivot bracket 14, and finally, the pivot structure 15 is fixed to the mounting disc 11 by a plurality of bolts 16. By such arrangements, the tool pots can be rotated to the position where the tool is to be pivoted down and changed.

It is to be noted that on a single conventional mounting disc is usually provided many sets of tool pots, for example, on a single mounting disc of the most common specification is usually provided twenty four sets of tool pots for receiving twenty four types of grinding and cutting tools. Therefore, in assembly of the mounting disc and the respective tool pots, it must assemble the respective tool pots, pivots, pivot structures, and bolts to the mounting disc, respectively, and such assembly operation should be repeated for 24 times. Not only is the number of the components large, the cost of the components is pretty high, and the assembly cost is also very high, but also the follow-up maintenance work will be very complicated.

It is apparent from the foregoing description that in the assembly structure of the conventional tool magazine and the mounting disc, the components which have the highest cost and the most complicated assembly process are the pivotal connection structure between the pivotal structure and the tool pot and the locking connecting structure between the pivotal structure and the mounting disc. If the pivots, the pivotal structures and the bolts can be omitted, in addition to the fact that the structure and the components of the tool magazine can be substantially simplified, and most importantly, the cost for assembling these structures and components can be reduced considerably.

The present invention has arisen to mitigate and/or obviate the afore-described disadvantages.

SUMMARY OF THE INVENTION

The primary objective of the present invention is to provide a tool pots mounting structure for a tool magazine. The tool pots inside the tool magazine can be engaged into the engaging notches of the first and second mounting discs directly without using locking means. In assembly of the respective tool pots to the two mounting discs, the respective tool pots can be directly placed into the engaging notches of the two mounting discs without any bolts, pivots or pivotal structures, and without using tools, such as power screwdriver, to assemble the tool pots. Hence, not only is the assembly process simplified, the assembly cost is reduced, but also the follow-up maintenance work is also reduced. For the whole field of tool magazine manufacturing, it undoubtedly is a revolutionary technological breakthrough.

The further objective of the present invention is to provide simply structured tool pots mounting structure for a magazine, wherein a tool change device is disposed at one side of a tool change port of the tool magazine, by using a pressure cylinder to drive a drive member to move, and further driving a pivotal member to clamp the desired tool pot, the tool pot can be pivoted to disengage from the first and second mounting discs. By such arrangements, the present invention can carry out the tool change operation with only a single tool change device. Hence, not only is the cost of the present invention considerably reduced, but also the assembly process is also much simplified.

DETAILED DESCRIPTION OF THE PREFERRED EMBODIMENTS

Figure 1:
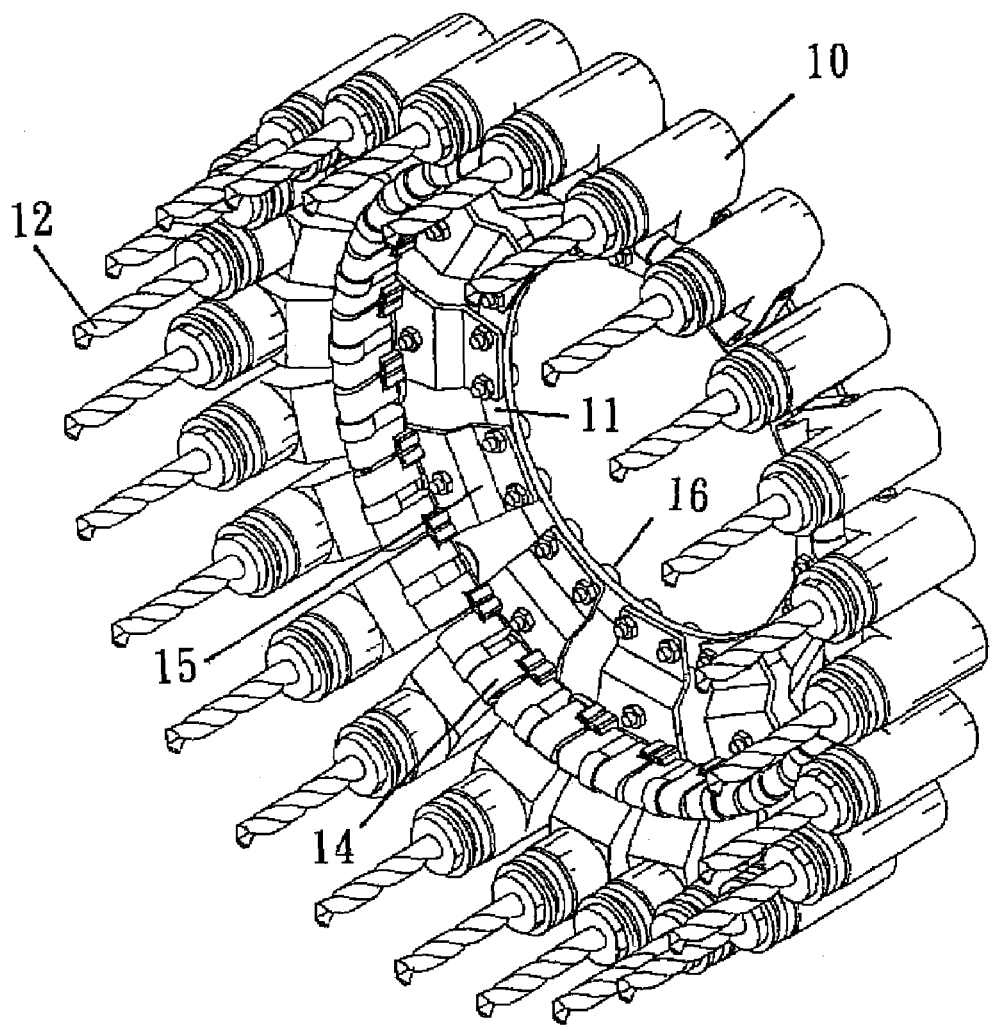
FIG. 1 is a perspective view showing the conventional assembly of a mounting disc, tool pots and tools.
Figure 2:
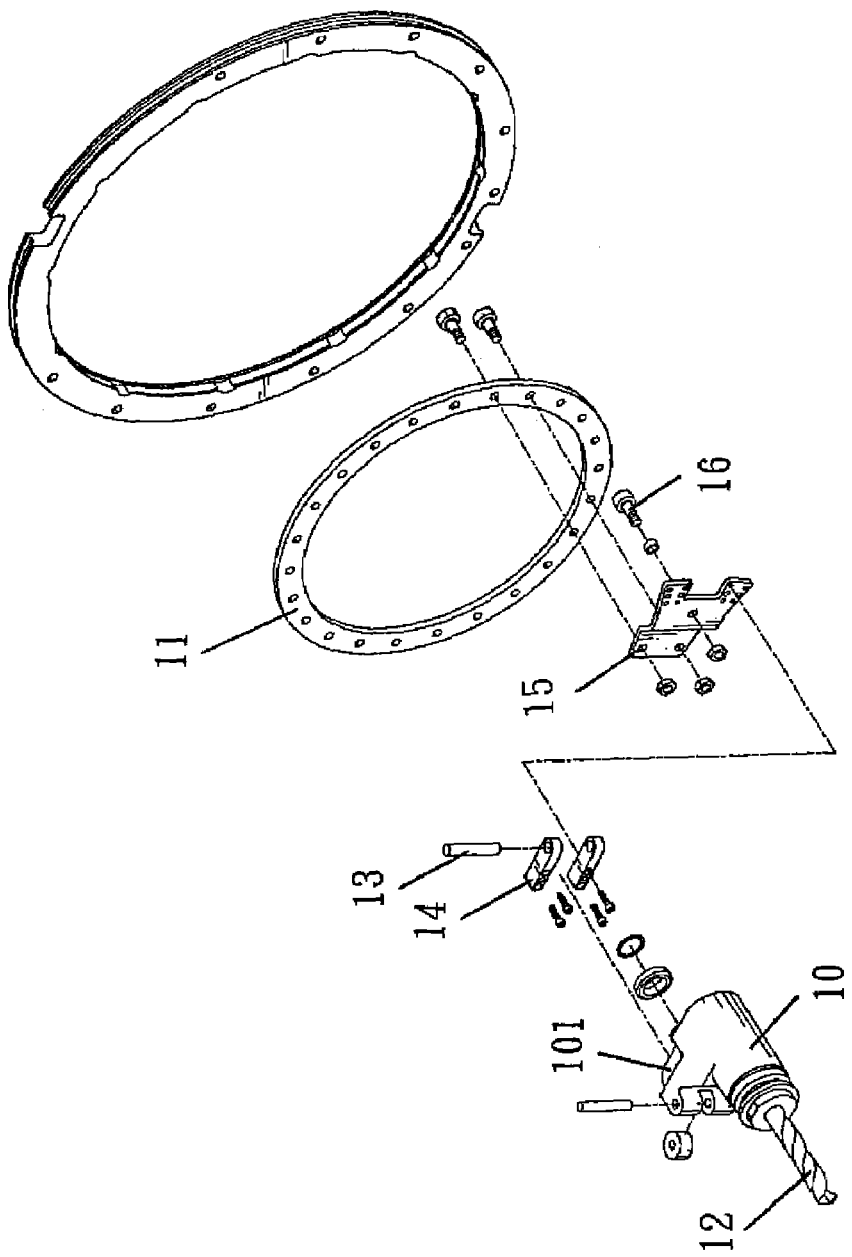
FIG. 2 is an exploded view showing the conventional mounting disc, tool pot, pivotal member, shaft bracket, and blots.
Figure 3:
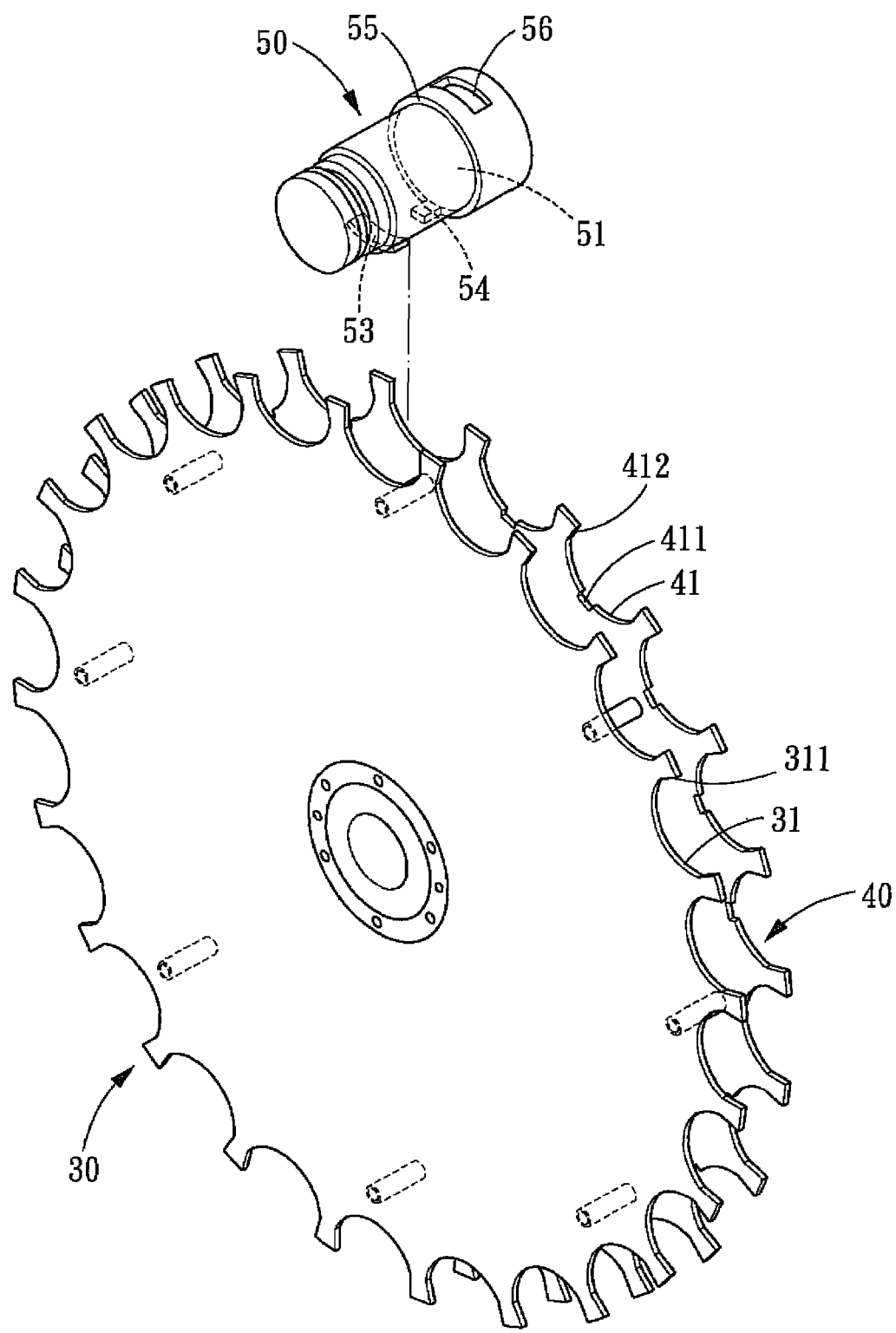
FIG. 3 is an exploded view showing two mounting discs and a tool pot in accordance with the present invention.
Figure 4:
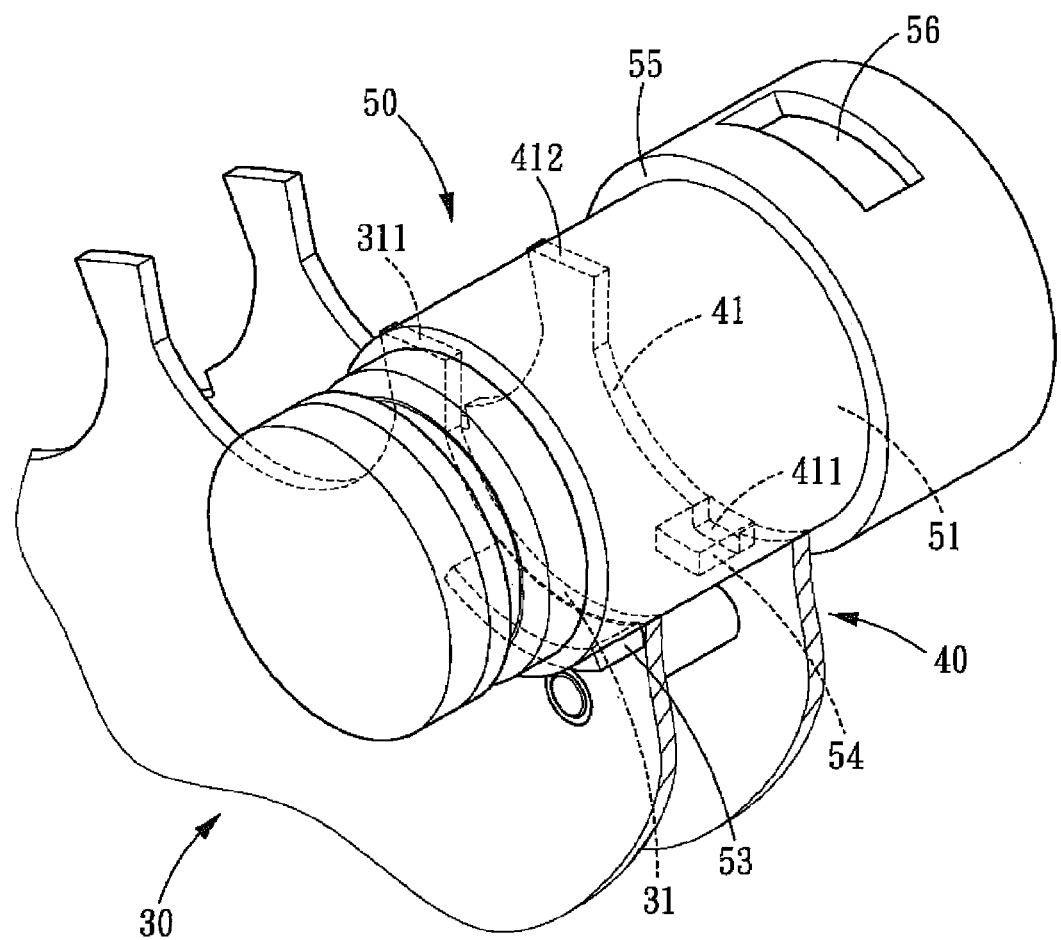
FIG. 4 is a partial amplified view in accordance with the present invention, showing that the tool pot is mounted on the two mounting discs.

The present invention will be clearer from the following description when viewed together with the accompanying drawings, which show, for purpose of illustrations only, the preferred embodiment in accordance with the present invention.

Referring to FIGS. 3-9, a tool pots mounting structure for a tool magazine in accordance with a preferred embodiment of the present invention is shown and comprises: a tool magazine 20, a first mounting disc 30, a second mounting disc 40, a plurality of tool pots 50, a tool change device 60. The tool pots inside the tool magazine can be engaged into the engaging notches of the first and second mounting discs directly without using locking means, and then the tool change device is used to carry out tool change operation.

The tool magazine 20 is provided with a protection housing 21 for accommodation of respective components of the tool magazine. On the inner surface of the housing 21 are disposed a plurality of rails 22 which are made of plastic ribs. The housing 21 is defined with a tool change port 211 which is in the form of a notch located in the lower edge of the housing 21, and inside the housing 21 is provided a rotary shaft 23.

The first mounting disc 30 is disposed in the housing 21 and mounted onto the rotary shaft 23 for rotation with it. The outer edge of the first mounting disc 30 is defined with a plurality of engaging notches 31 each of which is sunken in the middle and both sides of each of which rise gradually to form clamping edges 311. The number of the engaging notches 31 varies with the size of the tool magazine 30, for example, it can be 12, 24, 36, and etc, and in this embodiment, the number of the engaging notches 31 is 24.

The second mounting disc 40 is also mounted on the rotary shaft 23 and spaced a predetermined distance from the first mounting disc 30, so that the first and second mounting discs 30, 40 can rotate synchronously. The second mounting disc 40 is also formed around its outer edge with a plurality of engaging notches 41 each of which is sunken in the middle to form an engaging concave 411 and both sides of each of which rise gradually to form clamping edges 412. The engaging grooves 30 of the first mounting disc 30 are located corresponding to the engaging grooves 40 of the second mounting disc 40.

In each of the tool pots 50 is defined with a recess 51 for accommodation of the tools 52, and on the outer surface of the respective tool pots 50 are formed an engaging protrusion 53, a locking protrusion 54 and an engaging slot 56 and a stepped engaging flange 55. Each of the tool pot 50 is received in two corresponding engaging notches 31, 41 of the first and second mounting discs 30, 40, in such a manner that the engaging protrusion 53 is located at one side of the first mounting disc 30 and abutted against the lateral side of the engaging notch 31, the locking protrusion 54 is engaged in the engaging concave 411 of the second mounting disc 40, and the engaging flange 55 is abutted against one lateral side of the engaging notch 41 of the second mounting disk 40. Moreover, the outer surface of the tool pots 50 is abutted against the two rails 22. In this way, the respective tool pots 50 are stably confined and positioned in the magazine without the possibility of undesired displacement or falling out.

The tool change device 60 is disposed at one side of the tool change port 211 of the tool magazine and includes a pressure cylinder 61, a drive member 62, a pivotal member 63, a support member 64 and an elastic assembly 65. The pressure cylinder 61 is provided with a transmission shaft 611 which is driven to move back and forth in the axial direction. The pressure cylinder 61 is fixed to the tool magazine 20 via a fixing seat 612. The transmission shaft 611 is inserted in one end of the drive member 62 and fixed therein by nuts 613, and the other end of the drive member 62 is defined with a mounting gap 621. One end of the pivotal member 63 is inserted with a shaft 631, and the other end is defined with a locking portion 632. The drive member 62 is mounted on the shaft 631 via the mounting gap 621, and the mounting gap 621 corresponds to the radial direction of the shaft 631. The extension direction of the shaft 631 is vertical to that of the transmission shaft 611. The support member 64 is pivotally connected to the pivotal member 63 via a pivot 641, and the pivot 641 is also pivotally connected to the tool magazine 20. The support member 64 has a support portion 642 located correspondingly below the locking portion 632 of the pivotal member 63. On the support portion 642 are disposed protrusions 644. The elastic assembly 65 includes a mounting member 651, a spring 652 and a pushing member 653. The mounting member 651 is received in a receiving hole 643 of the support member 64, the spring 652 is biased between the mounting member 651 and the pushing member 653, so that the pushing member 653 is elastically pushed against the shaft 631 inserted on the pivotal member 63. Under normal condition, one side of the tool pot located at the tool change port 211 is in contact with the first and second mounting disc 30, 40, the locking portion 632 of the pivotal member 63 is located outside the tool pot 50, and the other side of the tool pot 50 is located on the support portion 642 of the support member 64. With the abovementioned structures and arrangements, the tool pots 50 can be mounted to the first and second mounting discs 30, 40. The extension and retraction motion of the transmission shaft 611 of the pressure cylinder 61 makes the drive member 62 drive the locking portion 632 of the pivotal member 63 to catch or release the tool pot 50, and when the locking portion 632 catches the tool pot 50, the further retraction motion of the transmission shaft 611 make the support member 64 pivot, so that the tool pot 50 is pivoted down to the tool change position.

The above description is the assembly relations of the respective structures and components of the present invention. The present invention is not only simple in structure, but also the respective tool pots can be mounted onto the first and second mounting discs without using any bolts, pivots or the like means, further, it only needs a single tool change device to carry out tool change operation. The operation and function of the present invention are explained as follows:

Referring to FIGS. 3-5 again, in assembly of the respective tool pots 50 to the mounting discs 30 and 40, the tool pot 50 can be engaged in the engaging notches 31, 41 easily after it is aligned with them. The engaging protrusion 53 is abutted against the lateral side of the engaging notch 31 of the first mounting disc 30, the locking protrusion 54 is engaged in the engaging concave 411 of the second mounting disc 40, and the lateral edge of the engaging notches 41 of the second mounting disc 40 is abutted against the engaging flange 55. In addition, the outer surface of the tool pots 50 is abutted against the two rails 22. In this way, the respective tool pots 50 are stably confined and positioned in the magazine without the possibility of undesired displacement or falling out. The assembly process requires no screw means or additional structures.

Figure 5:
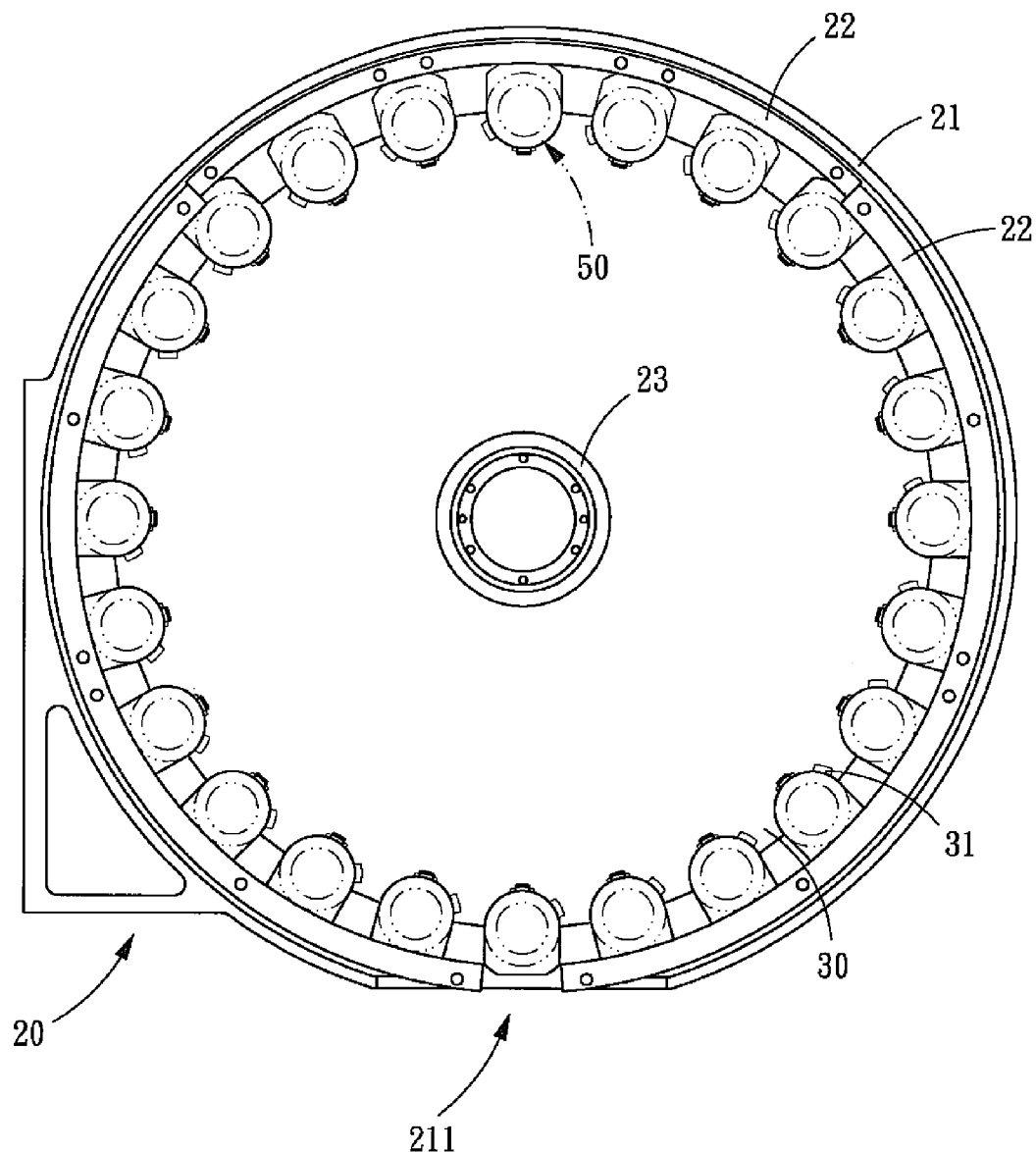
FIG. 5 is a front view in accordance with the present invention, showing that the tool pots are mounted on the two mounting discs.
Figure 6:
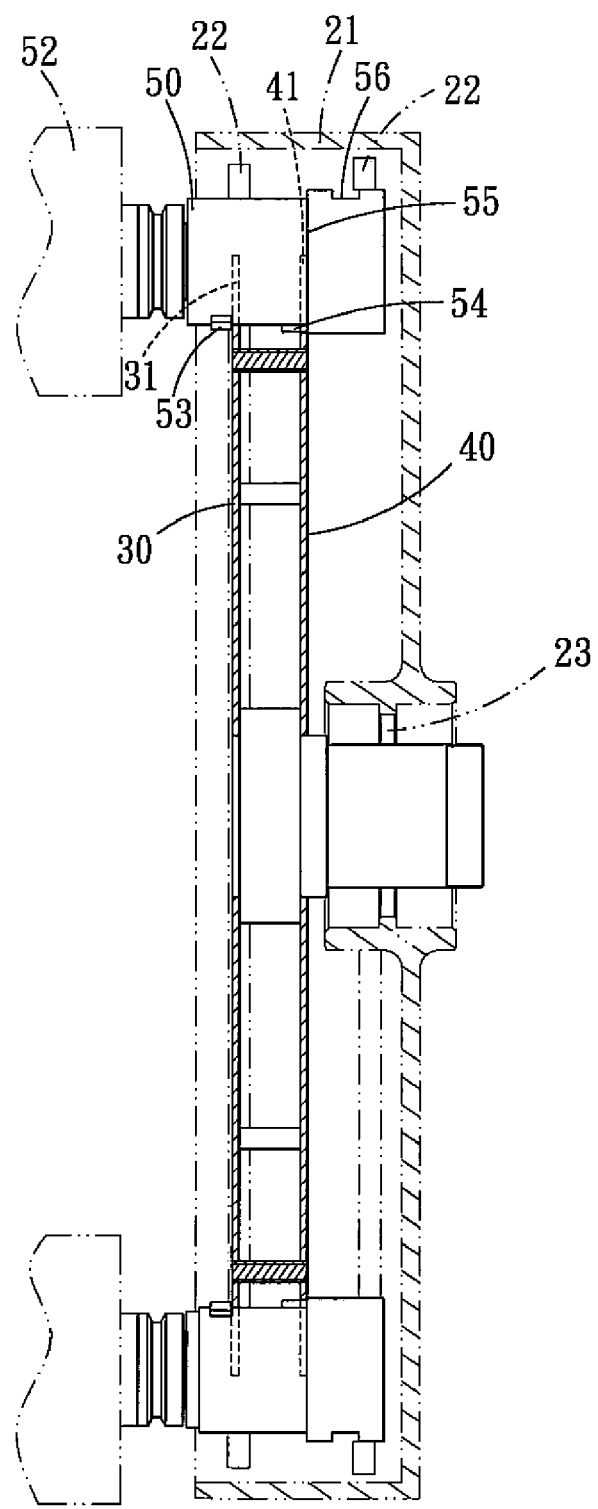
FIG. 6 is a cross sectional view in accordance with the present invention, showing that the tool pots are mounted on the two mounting discs.
Figure 7:
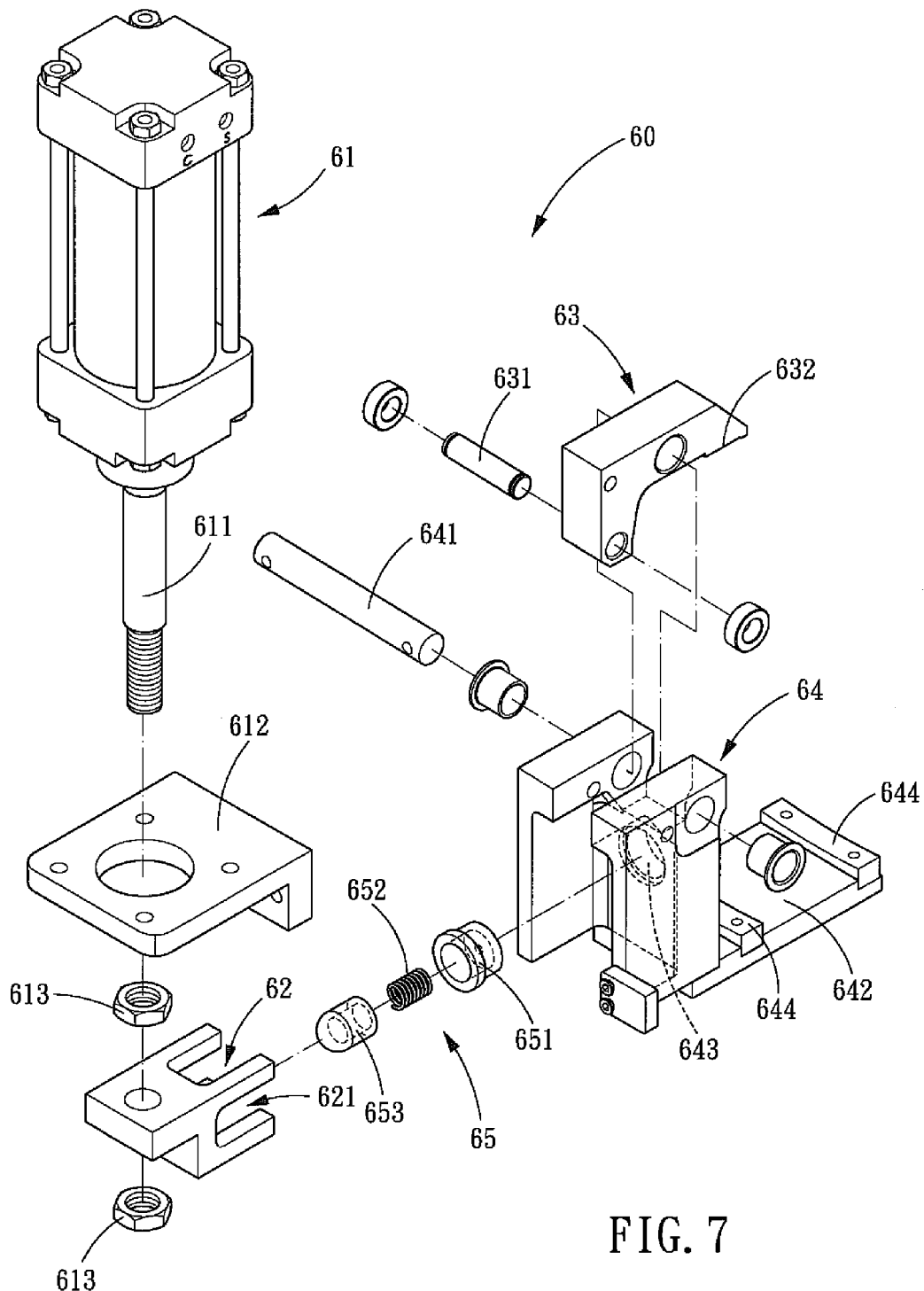
FIG. 7 is an exploded view of a tool change device in accordance with present invention.
Figure 8:
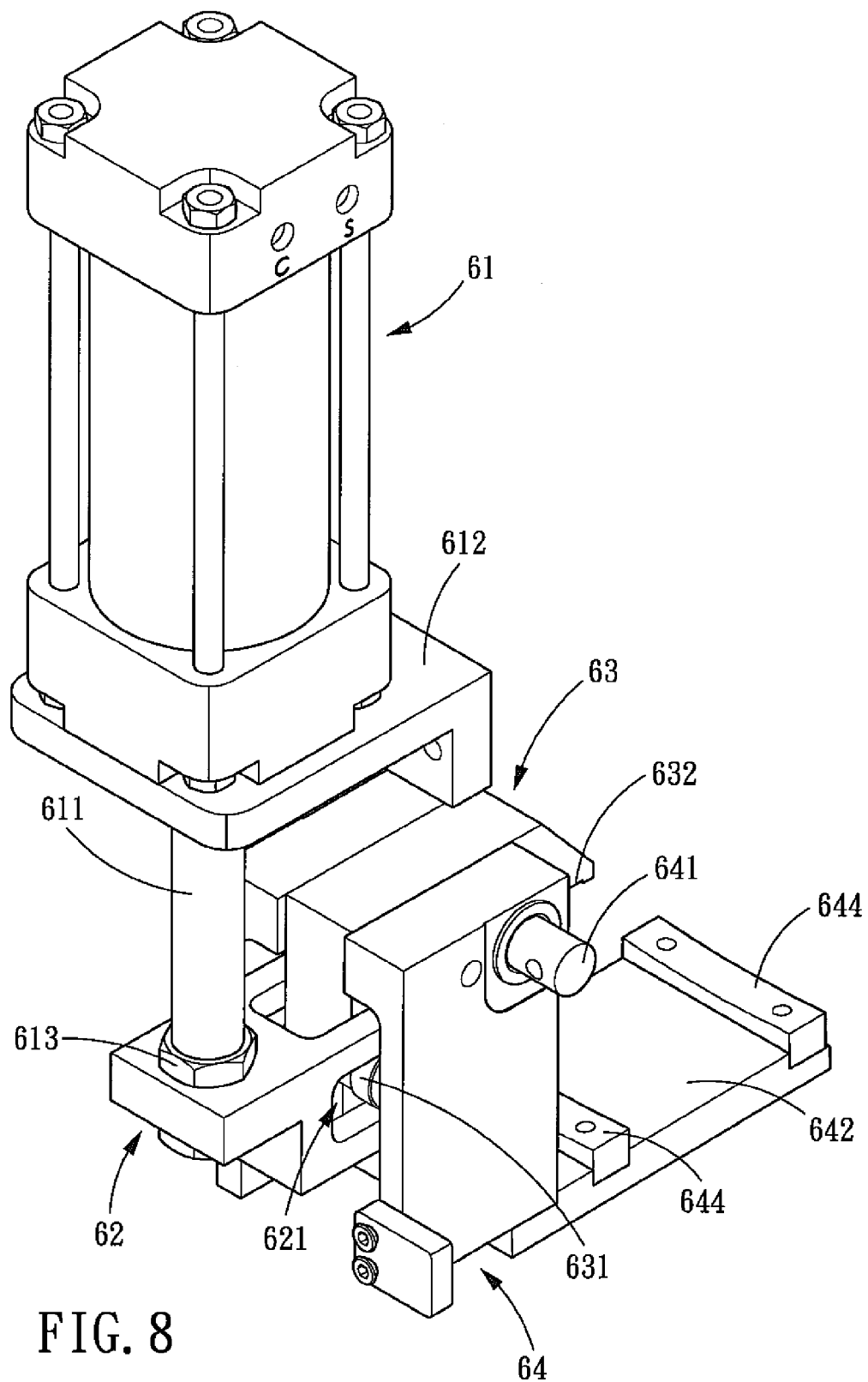
FIG. 8 is an assembly view of FIG. 7.
Figure 9:
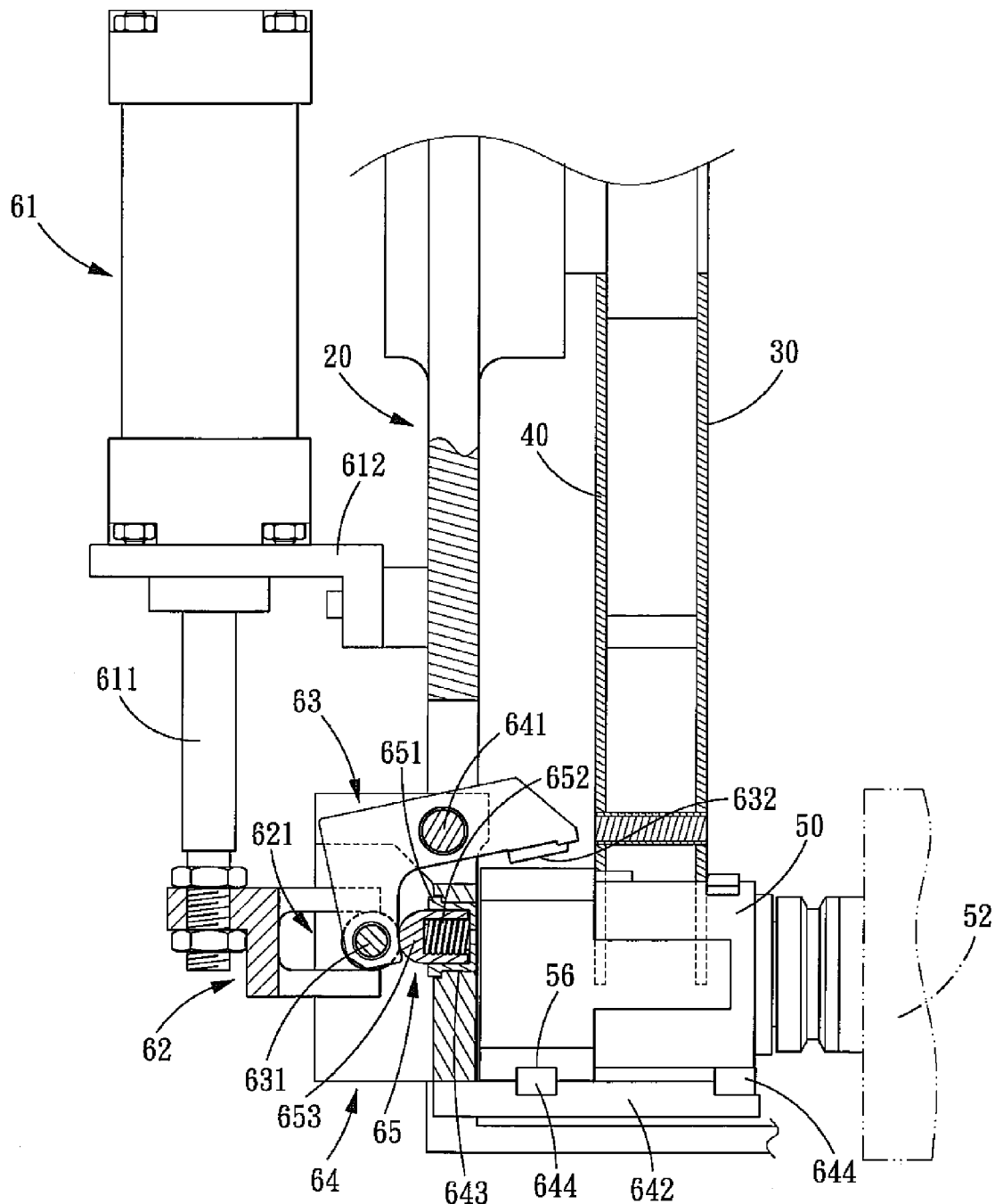
FIG. 9 is a cross sectional view in accordance with the present invention, showing that the tool change device is assembled to the tool magazine before the tool pot is pivoted down.
Figure 10:
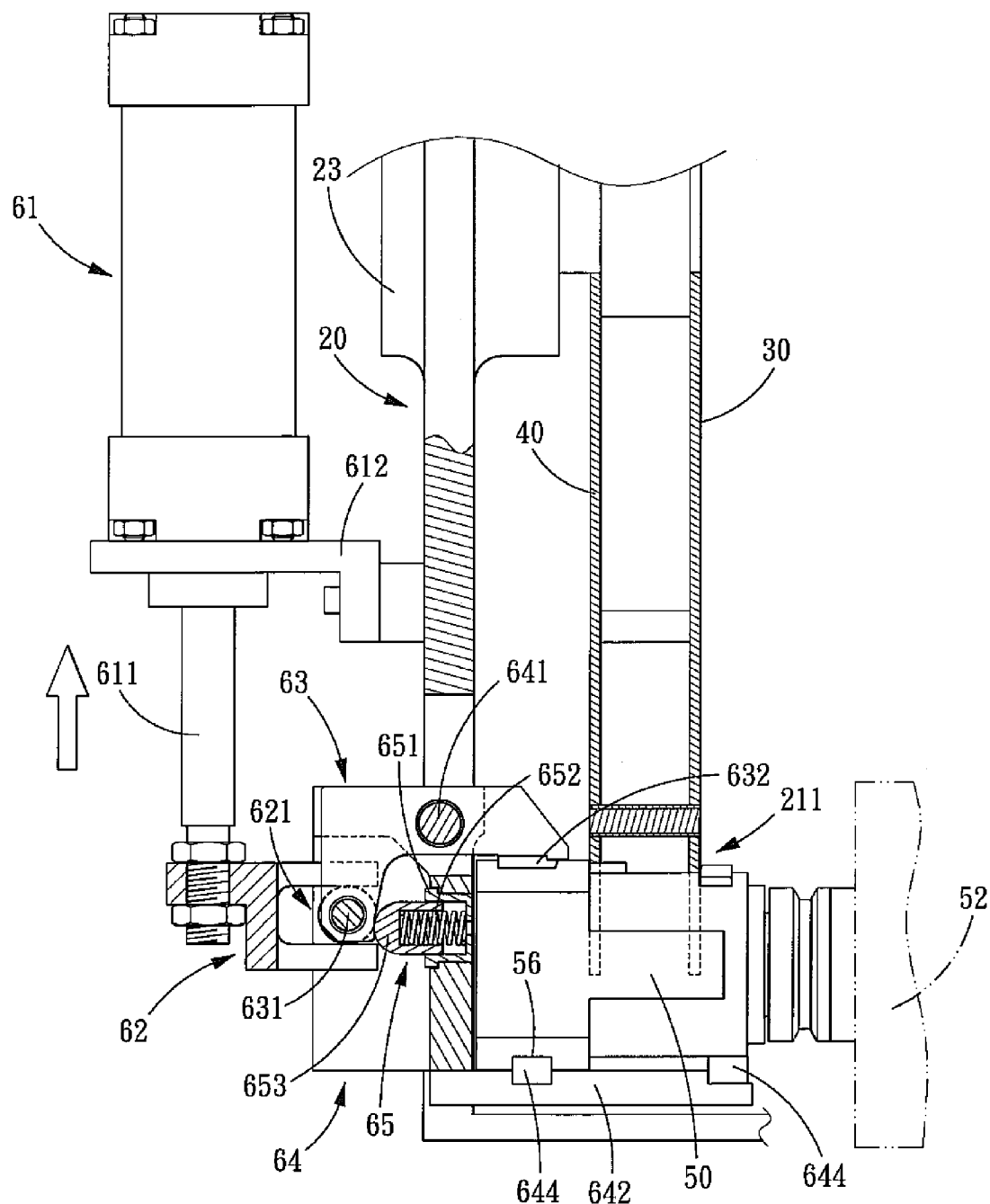
FIG. 10 is a cross sectional view of FIG. 9 showing that the transmission shaft is retracted for the first time to make the pivotal member pivot down to clamp the tool pot.
Figure 11:
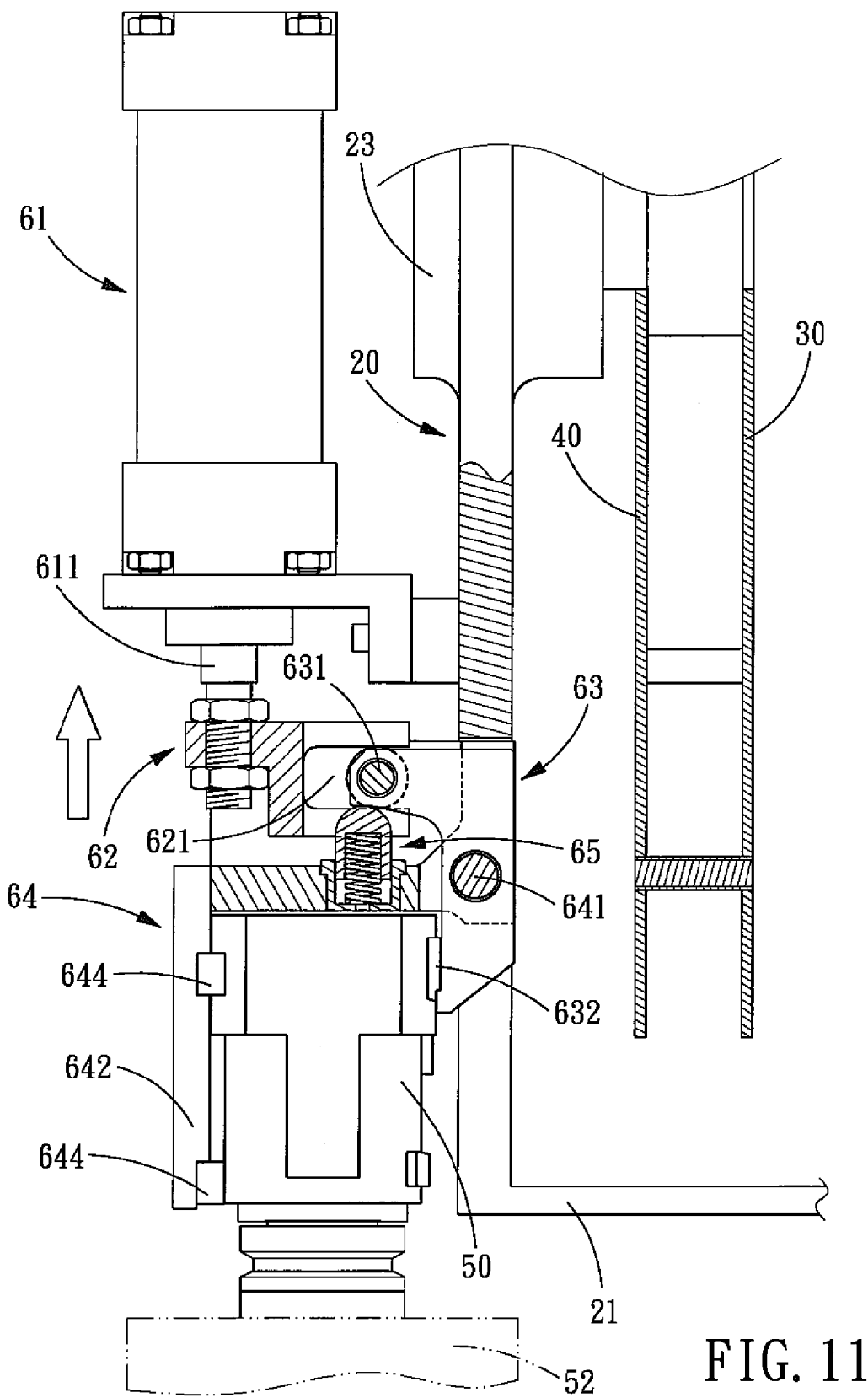
FIG. 11 is a cross sectional view of FIG. 10 showing that the transmission shaft is retracted for the second time to make the tool pot pivot down to the tool change position together with the support member.

The tool change operation in accordance with the present invention is explained as follows: first, the rotation of the first and second mounting discs 30, 40 rotates the desired tool pot to the tool change port 211 (as shown in FIGS. 5 and 9), at this moment, since there is no rail 22 at the tool change port 211, the engaging slot 56 of the tool pot 50 is right engaged with the protrusions 644 of the support member 64, so that the tool pot 50 can be prevented from falling off when being positioned in the tool change port 211. To pivot down the tool pot, the transmission shaft 611 retracts for the first time to move the drive member 62, making the pivotal member 63 pivot about the pivot 641, and then the locking portion 632 clamps one side of the too pot 50 (as shown in FIG. 10). After that, the transmission shaft 611 retracts for the second time to make the support member 64 and the tool pot 50 clamped by it pivot down around the pivot 641 (as shown in FIG. 11), during the process of pivoting down, the tool pot 50 is disengaged from the engaging notches 31, 41 of the first and second mounting discs 30, 40 and finally pivoted into the position ready for change (as shown in FIG. 11). It is to be noted that during the rotation process of the pivotal member 63, the design that the elastic assembly 65 keeps elastically pushing against the shaft 631 of the pivotal member 63 makes the locking portion 632 of the pivotal member 63 keep tightly clamping the tool pot 50, so as to prevent the occurrence of clearance which will cause instability between the tool pot 50 and the locking portion 632.

In other words, the present invention can perform the operation of pivoting down the respective tool pots with a single tool change device, and there is no any pivot structure between the tool pots and the first and second mounting discs, avoiding many problems derived from the conventional pivotal structure provided on the respective tool pots. Furthermore, with the structure design of the present invention, the respective tool pots can be directly placed into the engaging notches of the two mounting discs without any bolts, pivots or pivotal structures, and without using tools, such as power screwdriver, to assemble the tool pots. Hence, not only is the assembly process simplified, the assembly cost is reduced, but also the follow-up maintenance work is also reduced.

While we have shown and described various embodiments in accordance with the present invention, it is clear to those skilled in the art that further embodiments may be made without departing from the scope of the present invention.

What is claimed is:

1. A tool pots mounting structure for a tool magazine, comprising:
   a tool magazine including a housing for accommodation components of the tool magazine, at least one rail being disposed on an inner surface of the housing, the housing being defined with a tool change port, and a rotary shaft being disposed in the housing;
   a first mounting disc disposed in the housing and mounted on the rotary shaft, a plurality of engaging notches being defined around an outer edge of the first mounting disc;
   a second mounting disc mounted on the rotary shaft and spaced a predetermined distance from the first mounting disc, so that the first and second discs can rotate synchronously, a plurality of engaging notches being defined around an outer edge of the second mounting disc and located corresponding to the engaging notches of the first mounting disc;
   a plurality of tool pots, each of which being formed on its outer surface with a locking protrusion and an engaging flange, each tool pot being mounted in two corresponding engaging notches of the first and second mounting discs in such a manner that the locking protrusion is engaged in an engaging concave of the second mounting disc, the engaging flange is abutted against one lateral side of the engaging notch of the second mounting disk, and an outer surface of the tool pot is abutted against the at least one rail; and
   a tool change device disposed at one side of the tool change port of the tool magazine and including a pressure cylinder, a drive member, a pivotal member and a support member, each of the tool pots, when located at the tool change port, being located between the pivotal member and the support member, the pressure cylinder drives the drive member to move and further makes the pivotal member clamp the tool pot, and enables the tool pot to pivot down and disengage from the first and second mounting discs.

2. The tool pots mounting structure for a tool magazine as claimed in claim 1,
   wherein the pressure cylinder includes a transmission shaft which is driven to move in an axial direction of the transmission shaft, the pressure cylinder is fixed to the tool magazine, the transmission shaft is inserted and fixed in one end of the drive member, the other end of the drive member is defined with a mounting gap, one end of the pivotal member has a pivot shaft inserted therein, and the other end of the pivotal member is defined with a locking portion, the drive member is mounted on the pivot shaft via the mounting gap, an extension direction of the pivot shaft is vertical to that of the transmission shaft, the support member is pivotally connected to the pivotal member via a pivot, and the pivot is also pivotally connected to the tool magazine, the support member has a support portion located correspondingly below the locking portion of the pivotal member, on the support portion are disposed protrusions,
   wherein under an operating condition, one side of the tool pot located at the tool change port is in contact with the first and second mounting disc, the locking portion of the pivotal member is located outside the tool pot, and the other side of the tool pot is located on the support portion of the support member, extension and retraction motion of the transmission shaft of the pressure cylinder makes the drive member drive the locking portion of the pivotal member to catch or release the tool pot, and when the locking portion catches the tool pot, in another operating condition, the further retraction motion of the transmission shaft makes the support member pivot, so that the tool pot is caused to pivot down to a tool change position.

3. The tool pots mounting structure for a tool magazine as claimed in claim 2, further comprising an elastic assembly which includes a mounting member, a spring, and a pushing member, the mounting member is received in a receiving hole of the support member, the spring is biased between the mounting member and the pushing member to elastically push the pushing member against the pivot shaft inserted in the pivotal member.

4. The tool pots mounting structure for a tool magazine as claimed in claim 1, wherein each of the tool pots is formed on its outer surface with an engaging protrusion which is located at one side of the first mounting disc and abutted against one lateral side of a respective one of the engaging notches of the first mounting disc.

* * * * *